(12) United States Patent
Bai et al.

(10) Patent No.: US 7,848,392 B2
(45) Date of Patent: Dec. 7, 2010

(54) RAKE RECEIVER AND DE-SPREADING METHOD THEREOF

(75) Inventors: Cheng-Zong Bai, Taipei (TW); Hsueh-Jyh Li, Taipei (TW); Po-Ying Chen, Hsinchu (TW)

(73) Assignee: Sunplus mMobile Inc., Hsinchu (TW)

( * ) Notice: Subject to any disclaimer, the term of this patent is extended or adjusted under 35 U.S.C. 154(b) by 496 days.

(21) Appl. No.: 11/957,487

(22) Filed: Dec. 17, 2007

(65) Prior Publication Data

US 2009/0003415 A1 Jan. 1, 2009

(30) Foreign Application Priority Data

Jun. 28, 2007 (TW) .............................. 96123507 A (51) Int. Cl.
*H04B 1/707* (2006.01)

(52) U.S. Cl. ...................................... 375/148

(58) Field of Classification Search ................ 375/144, 375/147–148, 346–349; 370/335, 342, 465; 455/132, 137
See application file for complete search history.

(56) References Cited

U.S. PATENT DOCUMENTS

| 6,215,814 | B1 * | 4/2001 | Ylitalo et al. ................ 375/148 |
| 6,385,181 | B1 * | 5/2002 | Tsutsui et al. ................ 370/335 |
| 7,010,019 | B2 * | 3/2006 | Reial ............................ 375/148 |
| 7,106,785 | B2 * | 9/2006 | Yoshida ........................ 375/148 |
| 7,356,071 | B2 * | 4/2008 | Li et al. ........................ 375/147 |
| 2001/0004356 | A1 * | 6/2001 | Faber ........................... 370/335 |
| 2006/0188007 | A1 | 8/2006 | Daneshrad et al. | |

OTHER PUBLICATIONS

Article tiiled "On the Equivalence of Linear MMSE Chip-Level Equalizer and Generalized RAKE" authored by H. Hadinejad-Mahram, IEEE Trans. Comm. Letters., vol. 8, Jan. 2004 (pp. 7-8).
Article titled "A Communication Technique for Multipath Channels" authored by Price et al., Proceedings of the IRE 1958, (pp. 555-570).
Article titled "Simple MMSE Equ alizers for CDMA Downlink to Restore Chip Sequence: Comparison to Zero-Forcing and RAKE" authored by Krauss et al., Proc, ICASSP 2000, (pp. 2865-2868).
Article titled "A Generalized RAKE Receiver for Interference Suppression" authored by Bottomley et al., IEEE J. Select. Areas Commun., vol. 18, Aug. 2000 (pp. 1536-1545).

* cited by examiner

*Primary Examiner*—Khanh C Tran
(74) *Attorney, Agent, or Firm*—Jianq Chyun IP Office (57) ABSTRACT

The invention relates to a rake receiver and a method for de-spreading thereof. A plurality of noise branches is adopted for producing a plurality of noise components in the rake receiver. Next, a noise combining unit adjusts each noise component according to a plurality of noise weights, so as to combine the noise components to obtain an interference-plus-noise estimation value. The rake receiver eliminates the noises in the main signal generated by the signal branches through using the interference-plus-noise estimation value. Therefore, the performance of a receiving terminal can be enhanced.

15 Claims, 6 Drawing Sheets

RAKE RECEIVER AND DE-SPREADING METHOD THEREOF

CROSS-REFERENCE TO RELATED APPLICATION

This application claims the priority benefit of Taiwan application serial no. 96123507, filed on Jun. 28, 2007. The entirety of the above-mentioned patent application is hereby incorporated by reference herein and made a part of this specification.

BACKGROUND OF THE INVENTION

1. Field of the Invention

The present invention relates to a rake receiver. More particularly, the present invention relates to a rake receiver using channel estimation.

2. Description of Related Art

Wireless communication system uses radio waves to transmit messages. During the process of transmitting electric waves, the electric waves are affected by buildings or automobiles in the environment, so signals from a transmitting terminal finally reach a receiving terminal after passing through various different reflection or refraction paths, and the time for the signal reaches the receiving terminal varies depending upon a different path. Therefore, the wireless communication environment is considered as a multi-path channel. From a perspective of mathematics, it is assumed that the signal transmitted from the transmitting terminal at the time t is expressed as s(t), the received signal r(t) received by the receiving terminal at the time t may be expressed the following equation:

$$r(t) = \sum_{l=0}^{L-1} h_l s(t - \tau_l) + n(t). \quad (1)$$

In the Equation (1), L is the number of paths, $\tau_l$ is the path delay time caused by the $l^{th}$ path in L transmission paths, $h_l$ is the channel gain of the $l^{th}$ path in L transmission paths, and n(t) is the channel noise.

Figure 1:
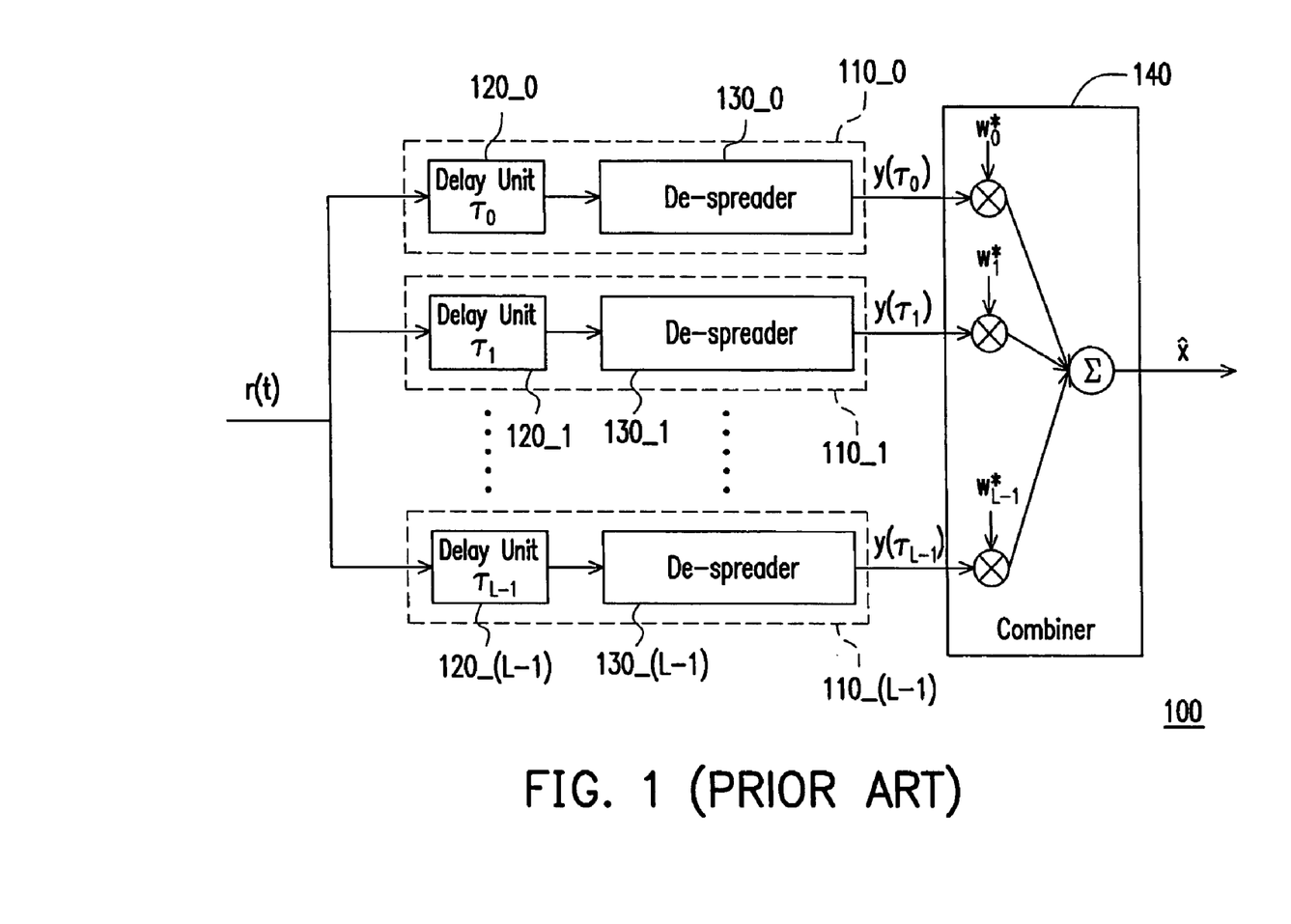
FIG. 1 is a schematic block diagram of a rake receiver in a CDMA system.

In the current communication system, a rake receiver is usually used in the receiving terminal, a plurality of branches (also called a plurality of fingers) therein is used to collect signals in different paths, so as to resist the signal attenuation caused by the multi-path channel. Among the current applications, the rake receiver is most commonly used in the code division multiple access (hereafter referred to as CDMA) system. FIG. 1 is a systematic block diagram of a rake receiver in a CDMA system.

Referring to FIG. 1, the rake receiver 100 includes a plurality of fingers 110_0-110_(L−1) and a combiner 140. The received signal r(t) is respectively input to delay units 120_0-120_(L−1) in the fingers 110_0-110_(L−1); and the delay units 120_0-120_(L−1) respectively delay the received signal r(t) for a time $\tau_0$-$\tau_{L-1}$ and then output it to de-spreaders 130_0-130_(L−1). Then, the de-spreaders 130_0-130_(L−1) are used to respectively generate signal components $y(\tau_0)$-$y(\tau_{L-1})$ for being output to the combiner 140. Upon receiving the signal components $y(\tau_0)$-$y(\tau_{L-1})$ output by the fingers 110_0-110_(L−1), the combiner 140 makes the received signal components $y(\tau_0)$-$y(\tau_{L-1})$ be respectively multiplied by a weight $w_0^*$-$w_{L-1}^*$, and then summed up, and outputs a de-spreading signal $\hat{x}$.

The number of the fingers 110_0-110_(L−1) is designed to be the number of the paths, the time $\tau_0$-$\tau_{L-1}$ in the delay units 120_0-120_(L−1) are the path delay time on each path obtained after the receiving terminal has performed the channel estimation, and the weights $w_0^*$-$w_{L-1}^*$ in the combiner 140 are the conjugate of channel gains on each path obtained after the receiving terminal has performed the channel estimation. That is to say, in the practical application, the rake receiver 100 of the receiving terminal sets each finger 110_0-110_(L−1) according to the channel estimation result, so as to collect signals of each path from the channel.

In the practical transmission, the CDMA system uses a plurality of spreading codes to transmit a plurality of user' signals at the same time, and uses the orthogonality between each spreading code to prevent the signals between the users from interfering with each other. Therefore, when the signal is interfered by the multi-path in the channel, the orthogonality between the spreading codes is also damaged, as a result, the signals between the users are mutually interfered, that is, multiple-user interference (MUI). In addition, the interference of the multi-path also causes inter-symbol interference (ISI) for the same user. However, the conventional rake receiver only considers the attenuation of the signals caused by the multi-path channel, but cannot overcome the MUI and the ISI problems.

From the perspective of mathematics, the conventional rake receiver assumes the noises n(t) in the channel as a white Gaussian noise, and only processes the signal attenuation caused by the multi-path (that is, only the path delay time $\tau_0$-$\tau_{L-1}$ and the channel gains $h_0$-$h_{L-1}$ of the multi-path channel are considered). However, during the practical channel transmission, due to the MUI and the ISI, the noises n(t) in the channel are not the white Gaussian noise, but colored Gaussian noise. Therefore, the conventional rake receiver ignores the MUI and the ISI, such that the performance of the receiving terminal becomes relatively poor, and meanwhile the bit error rate of the signals demodulated by the receiving terminal becomes relatively large.

Figure 2:
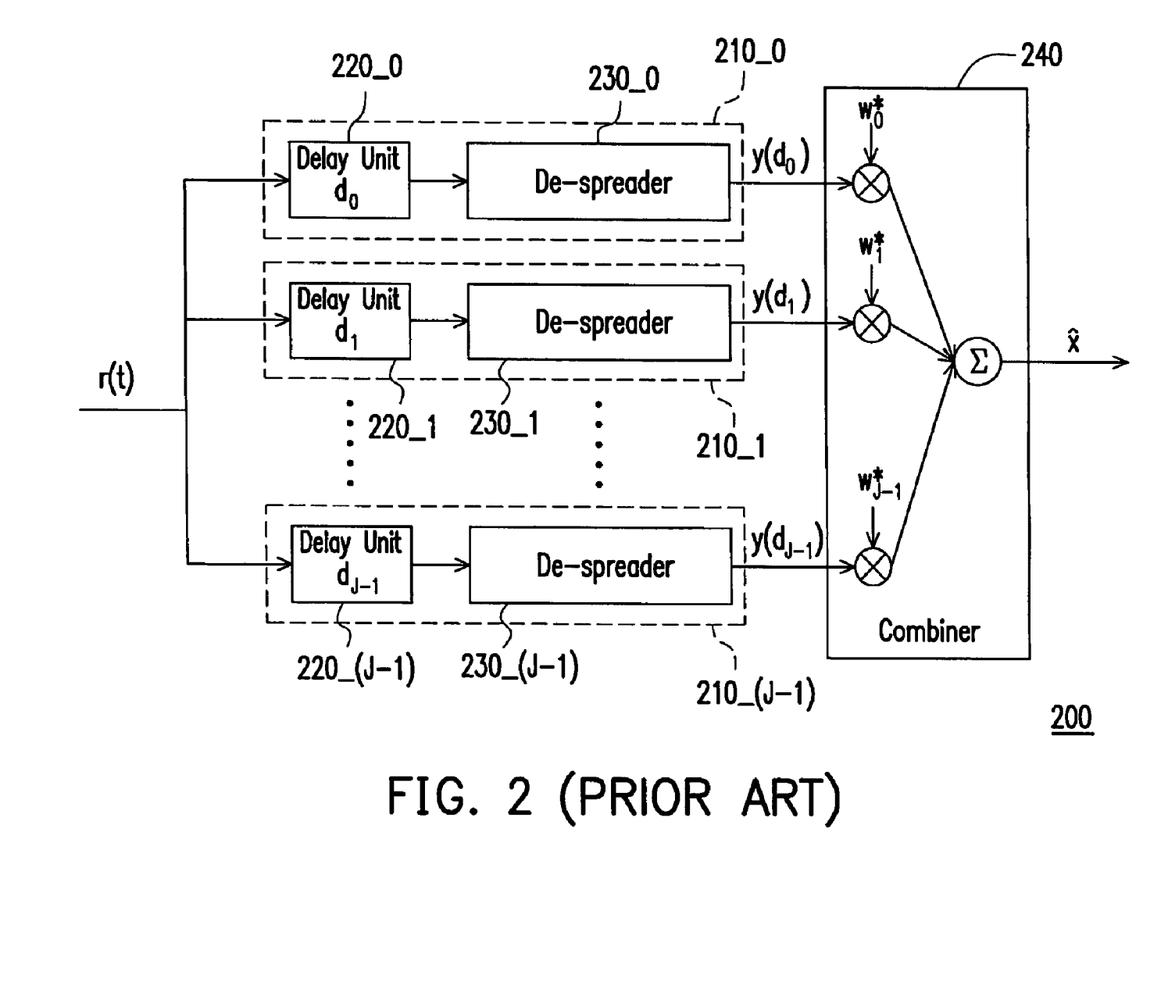
FIG. 2 is a schematic block diagram of a G-RAKE receiver in a CDMA system.

Recently, in order to solve the attenuation of the multi-path channel and to reduce the interference of the colored Gaussian noise of the channel, a US patent (Note [1]) and a paper (Note [2]) have proposed a generalized RAKE (hereafter referred to as G_RAKE) receiver. FIG. 2 is a systematic block diagram of a G-RAKE receiver in a CDMA system.

Referring to FIG. 2, a G-RAKE receiver 200 includes a plurality of fingers 210_0-210_(J−1) and a combiner 240. The architecture of the G_RAKE receiver 200 is similar to the rake receiver 100 in FIG. 1, except that the number of the fingers 210_0-210_(J−1) of the G-RAKE receiver 200 is J, and the value J is greater than the number of the paths L. Each time $d_0$-$d_{J-1}$ in the delay units 210_0-210_(J−1) does not necessarily correspond to the path delay time on the transmission path, but designed by utilizing a statistical value of the maximum signal-to-noise ratio (SNR).

In addition, the weights $w_0^*$-$w_{J-1}^*$ in the combiner 240 are calculated by using the maximum likelihood (ML) rule. The $w_0^*$-$w_{J-1}^*$ can be represented by a vector w, and the value of $w_0^*$-$w_{J-1}^*$ is calculated according to $w=R_u^{-1} h_f$, in which the superscript (−1) represents the matrix inversion operation. $h_f$ is the channel gain acquired through channel estimation. $R_u$ is a J×J matrix, in which the calculation process for each element value therein has been illustrated in the documents of Note [1] and the Note [2]. $R_u$ is defined as a covariance matrix of the vector u, and the elements in the vector u are noises included in the signal output from each finger of the G-RAKE receiver.

In the document of Note [2], it is illustrated that the number J of the fingers of the G-RAKE receiver is greater than the number L of the paths of the channel, which aims at making a part of the fingers match with the paths in the channel, so as to collect the signal of each path, and also aims at making the remaining fingers (that is, the inner delay time not equal to the path delay time of the multi-path channel) whiten the colored Gaussian noises in the channel. Therefore, the G-RAKE receiver can solve the attenuation of the multi-path channel and can reduce the interference of the colored Gaussian noise of the channel.

Although the G-RAKE receiver makes the receiving terminal have relatively desirable performance, the dimension of $R_u$ is J×J, such that a large amount of calculations is required when the inverse operation of the matrix $R_u$ is performed. In addition, the time $d_0$-$d_{J-1}$ designed through maximizing SNR also requires a considerably amount of calculations.

Note [1]: US Patent Publication No. US 2006/0188007 A1.

Note [2]: G. E. Bottomley, T. Ottosson, and Yi-Pin Eric Wang, "A Generalized RAKE Receiver for Interference Suppression", IEEE J. select. Areas Commun., vol. 18, pp. 1536-1545, August 2000.

SUMMARY OF THE INVENTION

Accordingly, the present invention is directed to a rake receiver for reducing the bit error rate of a signal demodulated by a receiving terminal, and meanwhile effectively reducing a complexity of the receiving terminal.

The present invention is also directed to a data demodulation method for estimating and eliminating noises and interference in the received signal under a condition of low complexity.

The present invention provides a rake receiver, which includes a channel estimation module, L signal branches, I noise branches, and a combiner. The channel estimation module estimates a plurality of path delay times and corresponding channel gains in the multi-path channel. L signal branches respectively delay the received signal for a plurality of channel path delay times to obtain a plurality of delayed received signals, and respectively de-spread each delayed received signal to output a plurality of signal components. I noise branches respectively delay the received signal for a plurality of preset times to obtain a plurality of delayed noise signals, and respectively de-spread each delayed noise signal to output a plurality of noise components respectively. The combiner first combines the signal components to generate a main signal, and combines the noise components to generate an interference-plus-noise estimation value, and further outputs a de-spreading signal according to a difference value between the main signal and the interference-plus-noise estimation value. The combiner adjusts weights of the plurality of signal components in the main signal according to the channel gains, and adjusts weights of the plurality of noise components in the interference-plus-noise estimation value according to I noise weights.

In an embodiment of the present invention, taking the $i^{th}$ signal branch among the L signal branches as an example, it includes a delay unit and a de-spreader. The delay unit delays the received signal for an $i^{th}$ channel path delay time to output an $i^{th}$ delayed received signal to the de-spreader. The de-spreader convolves the $i^{th}$ delayed received signal with a local spreading waveform, and samples the convolved result to an $i^{th}$ signal component. Taking the $j^{th}$ noise branch among the I noise branches as an example, it includes a delay unit and a de-spreader. The delay unit delays the received signal for a $j^{th}$ preset time to output a $j^{th}$ delayed noise signal to the de-spreader. The de-spreader convolves the $j^{th}$ delayed noise signal with a local spreading waveform, and samples the convolved result to a $j^{th}$ noise component.

In an embodiment of the present invention, the combiner includes a signal combining unit, a noise combining unit, and an adder. The signal combining unit combines a plurality of signal components according to L signal weights to generate and output the main signal, in which the L signal weights are obtained according to the channel gains of the multi-path channel. The noise combining unit combines a plurality of signal components according to I signal weights to generate and output the interference-plus-noise estimation value. The adder subtracts the interference-plus-noise estimation value from the main signal to output a de-spreading signal.

In an embodiment of the present invention, the plurality of signal weights is represented as $A_0$-$A_{L-1}$, and a signal weight vector formed by a conjugate value of the signal weights $A_0$-$A_{L-1}$ is represented as $\alpha=[A_0^*, \ldots, A_{L-1}^*]^T$. The plurality of noise weights is represented as $B_0$-$B_{I-1}$, and a noise weight vector formed by a conjugate value of the noise weights $B_0$-$B_{I-1}$ is represented as $\beta=[B_0^*, \ldots, B_{I-1}^*]^T$. In an embodiment of the present invention, the rake receiver further includes a noise weight calculating unit. The noise weight calculating unit calculates the noise weights $B_0$-$B_{I-1}$ through a noise matrix $R_u$ and an equation $\beta=R_n^{-1}R_{ns}\alpha$, and outputs them to the noise combining unit, in which $R_u$ is a covariance matrix of a noise vector u, with a dimension of (I+L)×(I+L), and the noise vector u is the noise in the signals output from the plurality of signal branches and the plurality of noise branches, with a length of I+L. The matrix $R_n$ is a I×I sub-matrix at a bottom right corner of the noise matrix $R_u$, the matrix $R_{ns}$ is a I×L sub-matrix at a bottom left corner of the noise matrix $R_u$, in which the superscript (−1) represents an inverse matrix operation.

In an embodiment of the present invention, the rake receiver further includes a noise branch selecting unit, which is used to select first I candidates having larger metrics from a plurality of candidates, to serve as the I preset times. The metric is $|\beta_i|^2 E[|z_n(m_i)|^2]$, the $i^{th}$ candidate corresponds to the $i^{th}$ preset time $m_i$, the $i^{th}$ noise branch generates the $i^{th}$ noise component $z_n(m_i)$ according to the $i^{th}$ preset time $m_i$, $\beta_i$ is a conjugate value of the noise weight corresponding to the $i^{th}$ noise component $z_n(m_i)$, and $E[\bullet]$ represents an expected value operation.

The present invention further provides a de-spreading method, which includes the following steps: estimating a plurality of channel gains and a plurality of corresponding path delay times in the multi-path channel; receiving a received signal from the multi-path channel; delaying the received signal for a plurality of channel path delay times respectively to obtain a plurality of delayed received signals, and de-spreading the delayed received signals respectively to generate a plurality of signal components; delaying the received signal for a plurality of preset times respectively to obtain a plurality of delayed noise signals, and de-spreading the delayed noise signals respectively to obtain a plurality of noise components; adjusting weights of the plurality of signal components in a main signal respectively according to the channel gains, so as to combine the signal components to obtain the main signal; adjusting weights of the plurality of noise components in an interference-plus-noise estimation value according to a plurality of noise weights, so as to combine the noise components to obtain the interference-plus-noise estimation value; and generating a de-spreading signal according to a difference between the main signal and the interference-plus-noise estimation value.

In an embodiment of the present invention, the step of generating the plurality of signal components includes: delaying the received signal for an $i^{th}$ channel path delay time to obtain an $i^{th}$ delayed received signal; and then convolving the $i^{th}$ delayed received signal with a local spreading waveform, and sampling the convolved result as an $i^{th}$ signal component. The step of generating the plurality of noise components includes: delaying the received signal for an $i^{th}$ preset time to obtain an $i^{th}$ delayed noise signal; and then convolving the $i^{th}$ delayed noise signal with a local spreading waveform, and sampling the convolved result to an $i^{th}$ noise component.

In an embodiment of the present invention, the step of combining to form the main signal includes: generating a plurality of signal weights according to the plurality of channel gains; multiplying the $i^{th}$ signal component by an $i^{th}$ signal weight, so as to generate an $i^{th}$ product; and adding up the above products to obtain the main signal. The step of combining to form the interference-plus-noise estimation value includes: multiplying an $i^{th}$ noise component by an $i^{th}$ noise weight to generate an $i^{th}$ product; and adding up the plurality of products to obtain the interference-plus-noise estimation value.

In an embodiment of the present invention, the number of the signal components is L, and the number of the noise components is I. The signal weights are represented as $A_0$-$A_{L-1}$, and a signal weight vector formed by a conjugate value of the signal weights $A_0$-$A_{L-1}$ is represented as $\alpha=[A_0^*, \ldots, A_{L-1}]^T$. The noise weights are represented as $B_0$-$B_{I-1}$, and a noise weight vector composed of a conjugate value of the noise weights $B_0$-$B_{I-1}$ is represented as $\beta=[B_0^*, \ldots, B_{I-1}]^T$. In an embodiment of the present invention, the de-spreading method further includes calculating a I×I sub-matrix at a bottom right corner of a noise matrix $R_u$ to obtain a matrix $R_n$, in which $R_u$ is a covariance matrix of a noise vector u, with a dimension of (I+L)×(I+L), and the noise vector u is formed by the noise in the signals components and the noise components, with a length of I+L; calculating a I×L sub-matrix at a bottom left corner of the noise matrix $R_u$ to obtain a matrix $R_{ns}$; calculating an inverse matrix of the matrix $R_n$ to obtain a matrix $R_n^{-1}$, wherein the superscript (−1) represents an inverse matrix operation; and using an equation $\beta=R_n^{-1}R_{ns}\alpha$ to calculate the noise weights $B_0$-$B_{I-1}$.

In an embodiment of the present invention, the de-spreading method further includes: calculating a metric of an $i^{th}$ candidate among a plurality of candidates; and selecting first I candidates having larger metrics to serve as the I preset times, in which the metric is $|\beta_i|^2 E[|z_n(m_i)|^2]$, the $i^{th}$ candidate corresponds to the $i^{th}$ preset time $m_i$, the $i^{th}$ preset time $m_i$ corresponds to the $i^{th}$ noise component $z_n(m_i)$, $\beta_i$ is a conjugate value of the noise weight corresponding to the $i^{th}$ noise component, and E[•] represents an expected value operation.

The present invention uses an interference-plus-noise estimation value generated by the plurality of noise branches and the noise combining unit to eliminate the noises in the main signal, so as to lower the bit error rate. In addition, in the present invention, when the noise weight is calculated, it is only necessary to calculate the inverse matrix of the sub-matrix $R_n$ in the noise matrix $R_u$, and thereby reducing the operations at the receiving terminal.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to overcome attenuation of the multi-path channel transmission and to restrain colored Gaussian noises in the channel, recently a G-RAKE receiver is proposed to improve the performance of the receiving terminal and the bit error rate. However, the operation complexity of the receiving terminal is greatly enhanced, and a large number of calculations are required. Therefore, the rake receiver provided by the present invention can maintain the performance and bit error rate as equivalent to the G-RAKE receiver, and can effectively lower the complexity and reduce the calculations in the operation.

In order to clearly illustrate the implementing manner of the present invention, it is assumed that the rake receiver provided by the present invention is applied to a spread-spectrum system. That is to say, a transmitting terminal makes the signal to be transmitted be multiplied by a spreading sequence. The spreading system can be a direct sequence code division multiple access (DS-CDMA) system and a wideband code division multiple access (W-CDMA) system, etc.

Figure 3:
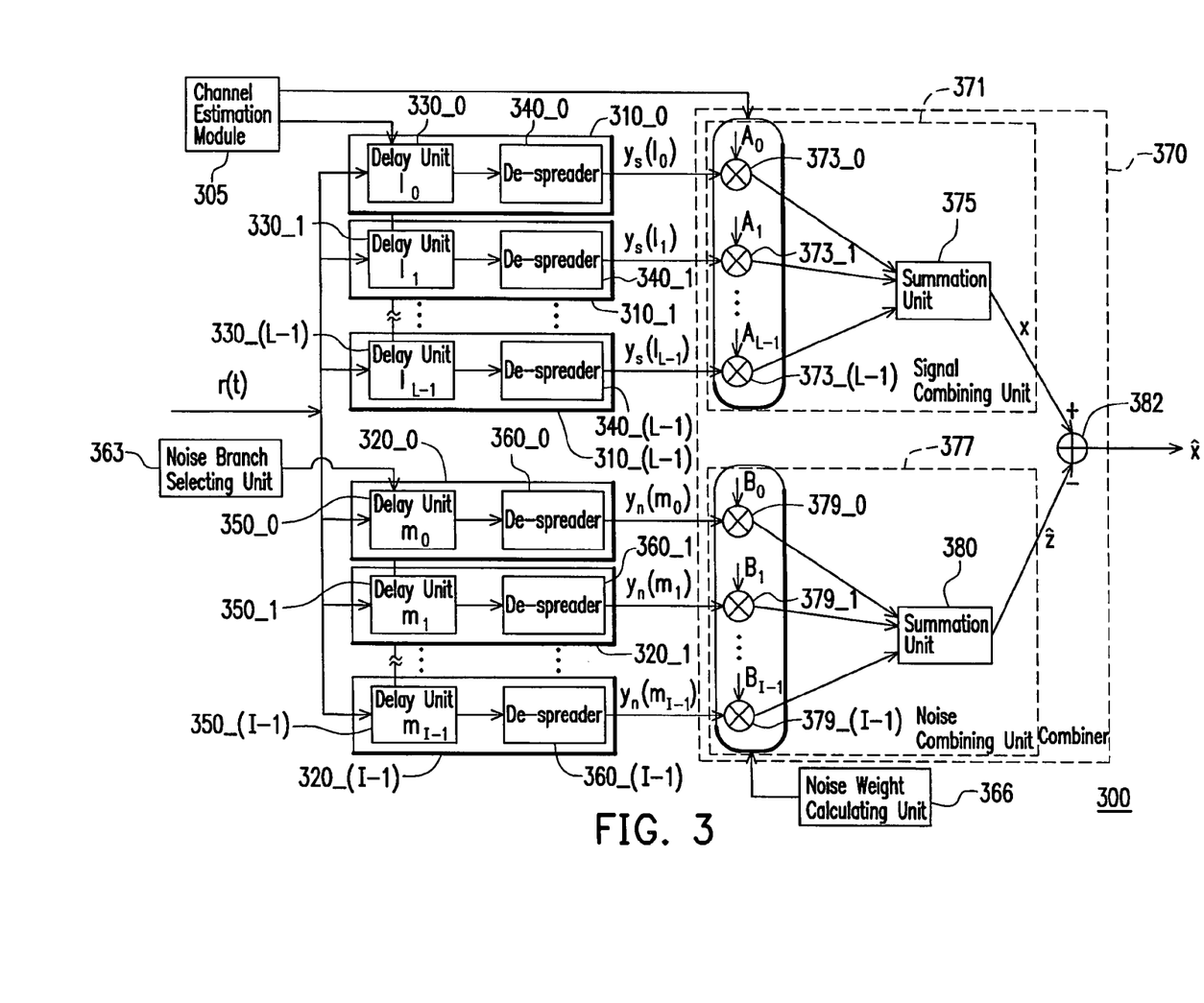
FIG. 3 is a schematic block diagram of a rake receiver according to an embodiment of the present invention.

FIG. 3 is a systematic block diagram of a rake receiver according to an embodiment of the present invention. Referring to FIG. 3, a rake receiver 300 includes a channel estimation module 305, signal branches 310_0-310_(L−1), noise branches 320_0-320_(I−1), and a combiner 370, in which both L and I are positive integers. The channel estimation module 305 estimates path delay times $h_0$-$h_{L-1}$ and corresponding channel gains $h_0$-$h_{L-1}$ for each path in the multi-path channel, and L is the number of the paths resolved by the channel estimation module 305. In this embodiment, how the channel estimation module 305 performs the channel estimation is not illustrated, but those of ordinary skill in the art shall know various channel estimation methods have been developed in the current communication technology, and as long as the channel estimation method is capable of estimating the path delay times $\tau_0$-$\tau_{L-1}$ and the corresponding channel gains $h_0$-$h_{L-1}$ for each path in the multi-path channel, it can be applied in the present invention.

Each signal branch 310_0-310_(L−1) in FIG. 3 includes a delay unit and a de-spreader. Taking the $i^{th}$ signal branch 310_i as an example, it includes a delay unit 330_i and a de-spreader 340_i, in which i is an integer between 0−(L−1). In addition, each noise branch 320_0-320_(I−1) also includes a delay unit and a de-spreader respectively. Taking the $j^{th}$ noise branch 320_j as an example, it includes a delay unit 350_j and a de-spreader 360_j, in which j is an integer between 0-(I-1).

The delay units 330_0-330_(L-1) in the signal branches 310_0-310_(L-1) respectively have signal delay times $l_0$-$l_{L-1}$ proportional to the path delay times $\tau_0$-$\tau_{L-1}$ estimated by the channel estimation module 305. In this embodiment, the proportional relation there-between is 1. That is, the delay time $l_0=\tau_0, l_1=\tau_1, \ldots, l_{L-1}=\tau_{L-1}$. In addition, the delay units 350_0-330_(I-1) in the noise branches 320_0-320_(I-1) respectively have preset times $m_0$-$m_{I-1}$. How to determine the preset times $m_0$-$m_{I-1}$ is illustrated below in the latter part of this embodiment in great detail.

The rake receiver 300 receives the received signal r(t) from the multi-path channel. The received signal r(t) is respectively input to the signal branches 310_0-310_(L-1) and the noise branches 320_0-320_(I-1). In this embodiment, after performing a similar process on the received signal r(t), each signal branch 310_0-310_(L-1) outputs signal components $y_s(l_0)$-$y_s(l_{L-1})$ respectively, so only the operation within the signal branch 310_1 is illustrated below. First, the delay unit 330_1 delays the received signal r(t) for $l_1$, so as to output a delayed received signal $r(t+l_1)$ to the de-spreader 340_1. Next, the de-spreader 340_1 convolves the delayed received signal $r(t+l_1)$ with a spreading waveform, then samples the convolved result as a signal component $y_s(l_1)$ when the time $t=l_1$, and outputs the signal component $y_s(l_1)$ to the combiner 370. The spreading waveform is a convolution of the local spreading sequence and the pulse shaping.

In this embodiment, after performing a similar process on the received signal r(t), each noise branch 320_0-320_(I-1) outputs noise components $y_n(m_0)$-$y_n(m_{I-1})$, so only the operations within the signal branch 320_1 is illustrated below. First, the delay unit 350_1 delays the received signal r(t) for a preset time $m_1$, so as to output a delayed received signal $r(t+m_1)$ to the de-spreader 360_1. Next, the de-spreader 360_1 convolves the delayed received signal $r(t+m_1)$ with the spreading waveform, then samples the convolved result to a noise component $y_n(m_1)$ when the time $t=m_1$, and then outputs the noise component $y_n(m_1)$ to the combiner 370.

The combiner 370 includes a signal combining unit 371, a noise combining unit 377, and an adder 382. After the combiner 370 receives the signal components $y_s(l_0)$-$y_s(l_{L-1})$ and the noise components $y_n(m_0)$-$y_n(m_{I-1})$, the signal combining unit 371 combines the signal components $y_s(l_0)$-$y_s(l_{L-1})$ according to different weights so as to generate and output a main signal x. The noise combining unit 377 combines the noise components $y_n(m_0)$-$y_n(m_{I-1})$ according to different weights, so as to generate and output an interference-plus-noise estimation value $\hat{z}$. Finally, the adder 382 subtracts the interference-plus-noise estimation value $\hat{z}$ from the main signal x to obtain and output a de-spreading signal $\hat{x}$.

The signal combining unit 371 includes L multipliers 373_0-373_(L-1) and a summation unit 375. Each multiplier 373_0-373_(L-1) makes the received signal components $y_s(l_0)$-$y_s(l_{L-1})$ be multiplied by the corresponding signal weights $A_0$-$A_{L-1}$, and outputs the obtained products to the summation unit 375. After the summation unit 375 sums up the products from the multipliers 373_0-373_(L-1), the sum is taken as the main signal x, which is output to the adder 382. The signal weights $A_0$-$A_{L-1}$ are, for example, obtained by performing a specific operation on the channel gains $h_0$-$h_{L-1}$ estimated by the channel estimation module 305, in which the specific operation can be conjugate of the channel gains $h_0$-$h_{L-1}$, or conjugate after multiplying the channel gains $h_0$-$h_{L-1}$ by a constant or a function. In this embodiment, the specific operation is, for example, conjugate of the channel gains $h_0$-$h_{L-1}$. Therefore, the signal weights $A_0=h_0^*$, $A_1=h_1^*, \ldots,$ and $A_{L-1}=h_{L-1}^*$.

The noise combining unit 377 includes I multipliers 379_0-379_(I-1) and a summation unit 380. Each multiplier 379_0-379_(I-1) makes the received noise components $y_n(m_0)$-$y_n(m_{I-1})$ be multiplied by the corresponding noise weights $B_0$-$B_{I-1}$, and then outputs the obtained products to the summation unit 380. The summation unit 380 sums up the products from the multipliers 379_0-379_(I-1), and takes the sum as the interference-plus-noise estimation value Z for being output to the adder 382. Here, in order to illustrate the content of the specification more fluently, how to obtain the noise weights $B_0$-$B_{I-1}$ is not illustrated for the moment. However, how to obtain the noise weights $B_0$-$B_{I-1}$ s illustrated in the latter part of this embodiment in great detail.

It is known from the above embodiment that the signal delay times $l_0$-$l_{L-1}$ of the delay units 330_0-330_(L-1) in the signal branches 310_0-310_(L-1) are generated according to the path delay times $\tau_0$-$\tau_{L-1}$ of the multi-path channel. The signal weights in the signal combining unit 371 are generated according to the channel gains $h_0$-$h_{L-1}$ of the multi-path channel. That is, the signal branches 310_0-310_(L-1) and the signal combining unit 371 are similar to the rake receiver 100 of FIG. 1, and the generated main signal x collects the signal components on each path in the multi-path channel, so as to resist the attenuation of the signal caused by the multi-path channel.

Although the signal branches 310_0-310_(L-1) and the signal combining unit 371 can overcome the attenuation of the multi-path channel, the generated main signal x still contains noises in the channel, and the noises may be generated due to the ISI and MUI, such that the noises in the channel are the colored Gaussian noise. The spirit of the present invention lies in utilizing the interference-plus-noise estimation value z generated by the noise branches 320_0-320_(L-1) and the noise combining unit 380 to eliminate the colored Gaussian noise in the main signal x.

The rake receiver 300 in the embodiment of the present invention further includes a noise branch selecting unit 363 and a noise weight calculating unit 366. The noise branch selecting unit 363 is used to select the preset times $m_0$-$m_{I-1}$ in the noise branches 320_0-320_(L-1), and the noise weight calculating unit 366 is used to generate the noise weights $B_0$-$B_{I-1}$. It is respectively deduced below how the noise weight calculating unit 366 calculates the noise weights $B_0$-$B_{I-1}$, and how the noise branch selecting unit 363 selects the preset times $m_0$-$m_{I-1}$, such that the interference-plus-noise estimation value $\hat{z}$ output by the noise combining unit 380 can be used to eliminate the noises in the main signal x.

First, in order to conveniently illustrate the following deduction process, several symbols are predefined. First, a signal weight vector formed by the conjugate value of the plurality of signal weights $A_0$-$A_{L-1}$ is defined as $\alpha=[A_0^*, \ldots, A_{L-1}^*]^T$, and a noise weight vector formed by the conjugate value of the plurality of noise weights $B_0$-$B_{I-1}$ is defined as $\beta=[B_0^*, \ldots, B_{I-1}^*]^T$. Next, the main signal x generated by the signal branches 310_0-310_(L-1) and the signal combining unit 371 further includes the noise in the channel, that is to say, the main signal x can be divided into a signal part and a noise part. Therefore, the noise part in the main signal x is defined as $z_\alpha$, and $z_\alpha$ has collected the noises in the signal components $y_s(l_0)$-$y_s(l_{L-1})$ output by each signal branch 310_0-310_(L-1), so $z_\alpha$ can be expressed as $$z_\alpha = \alpha^H z_s \qquad (2),$$

in which each element in the vector $z_s$ respectively represents the noises in the signal components $y_s(l_0)$-$y_s(l_{L-1})$.

Next, the noise components $y_n(m_0)$-$y_n(m_{I-1})$ output by the noise branches 320_0-320_(I-1) are defined as a vector $\underline{y}_n=[y_n(m_0), \ldots, y_n(m_{I-1})]^T$. Through the definitions of $\underline{y}_n$ and $\beta$, the interference-plus-noise estimation value output by the noise combining unit 377 is defined as $\hat{z}=\beta^H \underline{y}_n$. In addition, the noise branches 320_0-320_(I-1) in this embodiment are used to collect the interference and noises in the channel, and the noise components $y_n(m_0)$-$y_n(m_{I-1})$ output by the noise branches 320_0-320_(I-1) does not contain any data component. Therefore, it is assumed therein that $\underline{y}_n \approx \underline{z}_n$, that is, it is assumed herein that $\underline{y}_n$ only includes the interference and the noise $\underline{z}_n$.

Finally, the signal components $y_s(l_0)$-$y_s(l_{L-1})$ output by the signal branches 310_0-310_(L-1) are defined as a vectors $\underline{y}_s=[y_s(l_0), \ldots, y_s(l_{L-1})]^T$. Through the definitions of $\underline{y}_s$ and $\alpha$, the main signal output by the signal combining unit 371 is defined as $x=\alpha^H \underline{y}_s$. The de-spreading signal $\hat{x}$ output by the adder 382 can be expressed as:

$$\hat{x}=x-\hat{z}=\alpha^H \underline{y}_s - \beta^H \underline{y}_n \quad (3).$$

Hereinafter, the deduction of the noise weights $B_0$-$B_{I-1}$ may be described as follows.

First, the interference-plus-noise estimation value $\hat{z}$ output by the noise combining unit 377 is expected to eliminate the noise part $z_\alpha$ in the main signal x, and thus, according to the minimum mean-square error (MMSE) principle, it is necessary for the interference-plus-noise estimation value $\hat{z}$ to minimize $E[|\hat{z}-z_\alpha|^2]$, wherein $E[\bullet]$ represents the expected value operation.

Next, the interference-plus-noise estimation value $\hat{z}=\beta^H \underline{y}_n$ is substituted into min$\{E[|\hat{z}-z_\alpha|^2]\}$, and a Wiener-Hopf equation is used to acquire a noise weight vector:

$$\beta=E[\underline{y}_n \underline{y}_n^H]^{-1} E[\underline{y}_n z_\alpha^*] \quad (4).$$

From Equation (2) and $\underline{y}_n \approx \underline{z}_n$, Equation (3) is converted to:

$$\beta=E[\underline{z}_n \underline{z}_n^H]^{-1} E[\underline{z}_n \underline{z}_s^H]\alpha \quad (5).$$

The correlation matrix $E[\underline{z}_n \underline{z}_s^H]$ is defined as matrix $R_{ns}$ and the auto correlation matrix $E[\underline{z}_n \underline{z}_n^H]$ is defined as matrix $R_n$, and Equation (5) is converted to:

$$\beta=R_n^{-1} R_{ns} \alpha \quad (6).$$

According to Equation (6), the value of each element in $\beta$ can be deduced, so as to further acquire the noise weights $B_0$-$B_{I-1}$.

In the above illustration, it is not illustrated how to obtain the matrixes $R_{ns}$ and $R_n$. However, the matrixes $R_{ns}$ and $R_n$ are obtained from a noise matrix $R_u$. Furthermore, the method of calculating each element in the matrix $R_u$ has been illustrated through Equations (6), (7), and (8) in the document of Note [1] and Equations (25), (26), and (27) in the document of Note [2]. In addition, in the documents of Note [1] and Note [2], $R_u$ is defined as the covariance matrix of the noise vector u, and the noise matrix $R_u$ can be expressed as $$R_u=E[uu^H] \quad (7),$$

in which the element in the noise vector u is the noise in the signal output by each finger in the G-RAKE receiver.

Here, if the signal branches 310_0-310_(L-1) and the noise branches 320_0-320_(L-1) in the rake receiver 300 in this embodiment are considered as the fingers of the G-RAKE receiver, and the noise vector u can be considered as the concatenation of $z_s$ and $\underline{z}_n$. That is, the noise u can be expressed as:

$$u = \begin{bmatrix} z_s \\ z_n \end{bmatrix}. \quad (8)$$

The Equation (8) is substituted into Equation (7) to obtain:

$$R_u = E\left[\begin{bmatrix} z_s \\ z_n \end{bmatrix} \begin{bmatrix} z_s^H & z_n^H \end{bmatrix}\right] \quad (9)$$

$$= \begin{bmatrix} E[z_s z_s^H] & E[z_s z_n^H] \\ E[z_n z_s^H] & E[z_n z_n^H] \end{bmatrix}.$$

As viewed from Equation (9), it can be known that, the sub-matrixes $E[\underline{z}_n z_s^H]$ and $E[\underline{z}_n \underline{z}_n^H]$ in the noise matrix $R_u$ provided in the documents of Note [1] and Note [2] are respectively the defined matrixes $R_{ns}$ and $R_n$. The dimension of the noise matrix $R_u$ is (L+I)×(L+I), the matrix $R_n$ is the I×I sub-matrix at the bottom right corner of the noise matrix $R_u$, and the matrix $R_{ns}$ is the I×L sub-matrix at the bottom right corner of the noise matrix $R_u$.

In other words, the noise weight calculating unit 366 in the embodiment of the present invention only needs to calculate a part of the elements in the noise matrix $R_u$ so as to obtain the matrices $R_{ns}$ and $R_n$, then calculate the inverse matrix $R_n^{-1}$ of the matrix $R_n$, and then substitute the matrixes $R_{ns}$ and $R_n^{-1}$ into Equation (6) to obtain the value of each element in $\beta$, thereby further obtain the noise weights $B_0$-$B_{I-1}$.

It is known from the above process of determining the noise weights $B_0$-$B_{I-1}$ that, compared to the conventional G-RAKE receiver, the rake receiver provided by the present invention only needs to calculate a part of the elements in the matrix $R_u$. Furthermore, the rake receiver provided by the present invention only needs to calculate the inverse matrix of the matrix $R_n$ with the dimension of I×I, instead of calculating the inverse matrix of the noise matrix $R_u$ with the dimension of J×J, in which I is the number of the noise branches, and J is the number of all the branches, i.e., the number of noise branches and the number of the signal branches (L+I). Therefore, the rake receiver in this embodiment significantly reduces the calculations and the complexity required for generating the weights compared with the conventional G-RAKE receiver.

The signal branches 310_0-310_(L-1) of the rake receiver 300 in this embodiment are set to be used for collecting signals in each path. The noise branches 320_0-320_(I-1) are set to be used for eliminating the remainder interference and noises in the main signal x. Therefore, the preset times $m_0$-$m_{I-1}$ in the noise branches 320_0-320_(I-1) are determined by maximization of the signal to interference plus noise ratio (SINR) of the de-spreading signal $\hat{x}$ in principle. It is deduced below how the noise branch selecting unit 363 allocates the preset times $m_0$-$m_{I-1}$.

It is known from Equation (3) that, the de-spreading signal is $\hat{x}=\alpha^H \underline{y}_s - \beta^H \underline{y}_n$, and the interference plus noise energy in $\hat{x}$ is $E[|\alpha^H z_s - \beta^H \underline{z}_n|^2]$, and can be decomposed as:

$$E[|\alpha^H z_s - \beta^H \underline{z}_n|^2] = E[|z_\alpha|^2] - \alpha^H R_{ns}^H R_n^{-1} R_{ns} \alpha \quad (10).$$

The signal components in the de-spreading signal $\hat{x}$ are all provided by the signal branches 310_1-310_(L-1), which is independent of the noise branches 320_0-320_(I-1). Therefore, the maximizing of the SINR of the de-spreading signal $\hat{x}$ is equivalent to maximizing of $\alpha^H R_{ns}{}^H R_n{}^{-1} R_{ns}\alpha$ in Equation (10).

Herein, it is assumed that there are J candidates of the preset times, and the noise branch selecting unit 363 must select I preset times. J candidates can be determined according to the maximum path delay time estimated by the channel estimating unit or the hardware architecture of the receiver. I preset times yield $C_I^J = J!/I!(J-I)!$ kinds of different selections, that is, $J!/I!(J-I)!$ combinations of different preset times. According to Equation (10), after calculating the interference plus noise energy $E[|\alpha^H z_s - \beta^H \underline{z}_n|^2]$ generated in each selecting mode, a certain combination of I preset times that achieves the minimum interference plus noise energy $E[|\alpha^H z_s - \beta^H \underline{z}_n|^2]$ of the de-spreading signal $\hat{x}$ is found out.

However, all the $J!/I!(J-I)!$ kinds of combinations of different preset times require the calculation of $\alpha^H R_{ns}{}^H R_n{}^{-1} R_{ns}\alpha$ in Equation (10). During the calculation process, the calculations of the inverse matrix of $R_n$ and the matrix multiplication are required. Therefore, the process of selecting the preset times $m_0\text{-}m_{I-1}$ will result in large number of operations for the rake receiver. In order to lower the operations and to avoid calculations of matrix inversion and matrix multiplication, merely the effects of individual candidates on the elimination of the interference and the noise are considered in the embodiment of the present invention, and the first I candidates capable of effectively eliminating the interference are selected.

First, a candidate is taken as the preset time $m_i$ of a noise branch herein, and it is assumed that only this noise branch exists at this time, and thus, Equation (10) is simplified as:

$$E[|\alpha^H z_s - \beta^H \underline{z}_n|^2] = E[|\alpha^H z_s - \tilde{\beta}_i z_n(m_i)|^2] \quad (11),$$

in which $\beta_i^*$ is the noise weight corresponding to the noise branch, and $z_n(m_i)$ is the output of the noise branch. From $\beta$ obtained in Equation (5), the noise weight when only one noise branch exists is obtained as:

$$\beta_i = \frac{E[z_s^H z_n(m_i)]\alpha}{E[|z_n(m_i)|^2]}. \quad (12)$$

After expanding Equation (11), the interference plus noise energy can be obtained as:

$$E[|\alpha^H z_s - \beta^H \underline{z}_n|^2] = E[|z_\alpha|^2] - |\beta_i|^2 E[|z_n(m_i)|^2] \quad (13),$$

in which $z_\alpha$ is the noise part of the main signal x in the above definition, and is independent of the preset time selection in the noise branch. Therefore, in the process of selecting the preset times $m_0\text{-}m_{I-1}$ by the noise branch selecting unit 363, merely a metric corresponding to each candidate needs to be calculated, so as to find the first I candidates having relatively large metrics to serve as the preset times $m_0\text{-}m_{I-1}$. The metric is, for example, $|\beta_i|^2 E[|z_n(m_i)|^2]$ in Equation (13). In other words, the noise branch selecting unit 363 only needs to calculate the metric $|\beta_i|^2 E[|z_n(m_i)|^2]$ of each candidate, and it is not necessary to calculate the inverse matrix of $R_n$ and the matrix multiplication, so that the calculations required when selecting the preset time are reduced.

Figure 4:
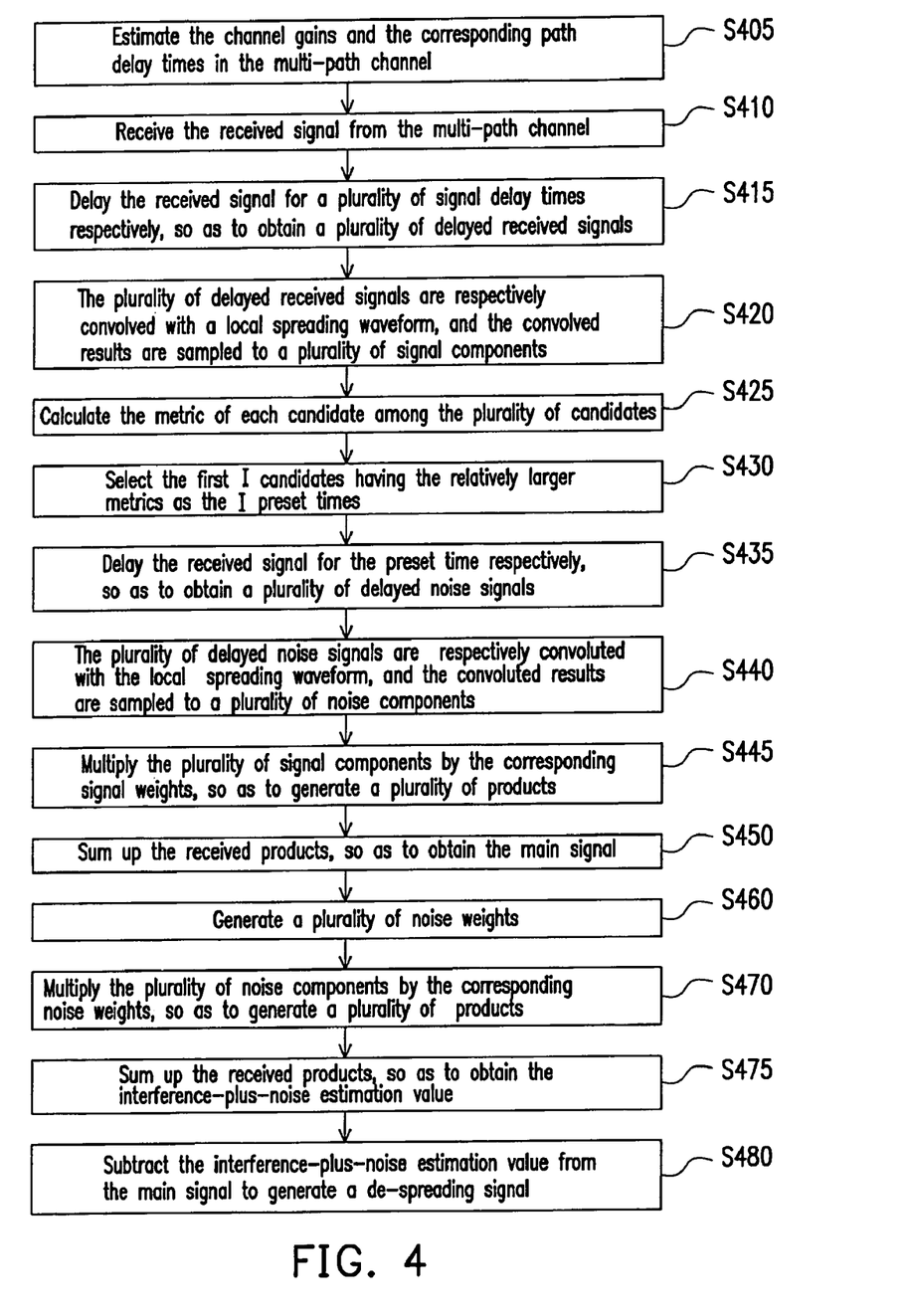
FIG. 4 is a flow chart showing the process steps of a de-spreading method according to an embodiment of the present invention.

According to the above rake receiver 300, a de-spreading method can be concluded. FIG. 4 is a flow chart showing the process steps of a de-spreading method according to an embodiment of the present invention. Referring to FIGS. 3 and 4, first, the channel estimation module 305 estimates the channel gains $h_0\text{-}h_{L-1}$ and the corresponding path delay times $\tau_0\text{-}\tau_{L-1}$ in the multi-path channel (Step S405). Next, the rake receiver 300 receives the received signal r(t) from the multi-path channel, and the received signal r(t) is input to the signal branches 310_0-310_(L-1) and the noise branches 320_0-320_(I-1) (Step S410). Next, the delay units 330_0-330_(L-1) in the signal branches 310_0-310_(L-1) respectively delay the received signal r(t) for a signal delay time $l_0\text{-}l_{L-1}$, so as to obtain the delayed received signals $r(t+l_1)\text{-}r(t+l_{L-1})$ (Step S415), and the de-spreaders 340_0-340_(L-1) in the signal branches 310_0-310_(L-1) respectively convolve the delayed received signals $r(t+l_0)\text{-}r(t+l_{L-1})$ with the local spreading waveform, and respectively sample the convolved results to the signal components $y_s(l_0)\text{-}y_s(l_{L-1})$ (Step S420).

Then, among the plurality of candidates, the noise branch selecting unit 363 calculates the metric $|\beta_i|^2 E[|z_n(m_i)|^2]$ of each candidate (Step S425), and selects the first I candidates having relatively large metrics as the preset times $m_0\text{-}m_{I-1}$ (Step S430).

Next, the delay units 350_0-350_(I-1) in the noise branches 320_0-320_(I-1) respectively delay the received signal r(t) for a preset time $m_0\text{-}m_{I-1}$, so as to obtain the delayed noise signals $r(t+m_0)\text{-}r(t+m_{I-1})$ (Step S435). The de-spreaders 360_0-360_(I-1) in the noise branches 320_0-320_(I-1) respectively convolve the delayed noise signals $r(t+m_0)\text{-}r(t+m_{I-1})$ with a local spreading waveform, and respectively sample the convolved results as the noise components $y_n(m_0)\text{-}y_n(m_{I-1})$ (Step S440).

After the signal combining unit 371 receives the signal components $y_s(l_0)\text{-}y_s(l_{L-1})$, the multipliers 373_0-373_(L-1) in the signal combining unit 371 make the signal components $y_s(l_0)\text{-}y_s(l_{L-1})$ be multiplied by the corresponding signal weights $A_0\text{-}A_{L-1}$, and output the generated products to the summation unit 375 (Step S445). The summation unit 375 sums up the received products, so as to obtain the main signal x (Step S450).

Figure 5:
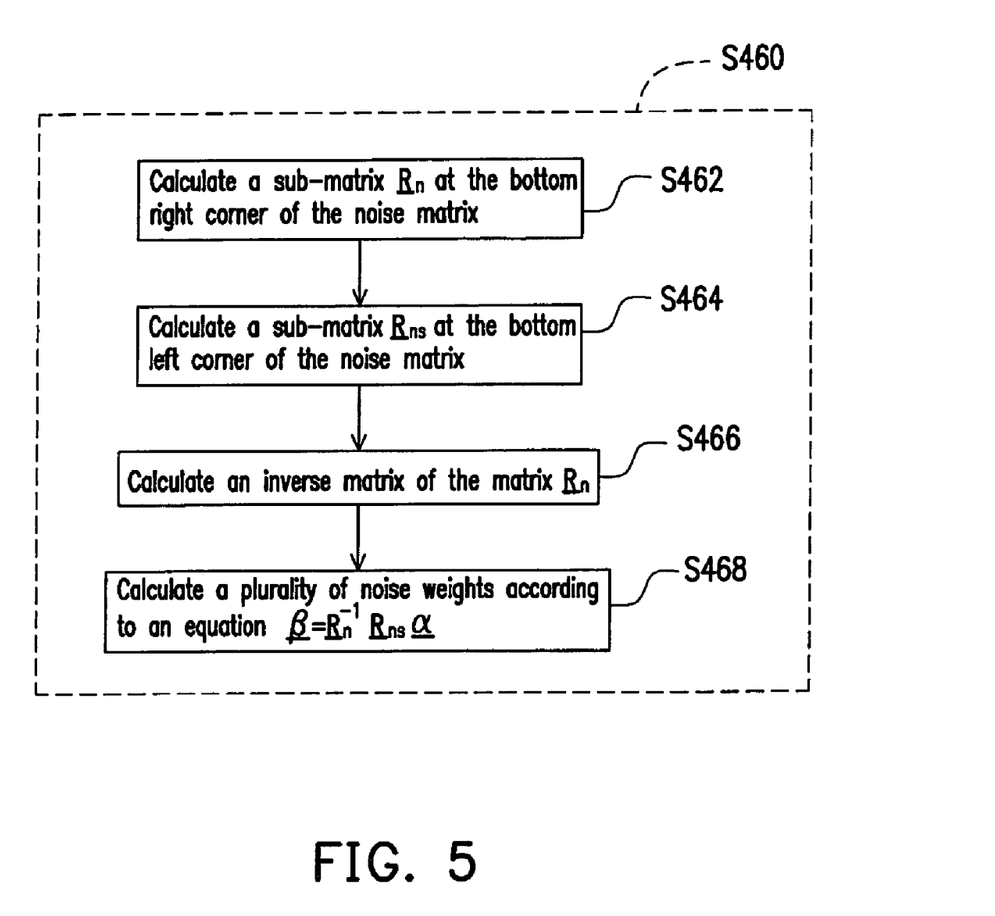
FIG. 5 is a flow chart showing the sub-steps of the Step S460 according to the embodiment of the present invention.

Next, the noise weight generating unit 366 generates a plurality of noise weights $B_0\text{-}B_{I-1}$ (Step S460). In this embodiment, Step S460 further includes a plurality of sub-steps as shown in FIG. 5. Referring to FIG. 5, firstly, a I×I sub-matrix at the bottom right corner of the noise matrix $R_u$ is calculated, so as to obtain the matrix $R_n$ (Step S462). Next, a I×L sub-matrix at the bottom left corner of the noise matrix $R_u$ is calculated, so as to obtain the matrix $R_{ns}$ (Step S464). The noise vector u includes the noises of the signal output by each signal branch and each noise branch, and has a length of I+L. $R_u$ is the covariance matrix of the noise vector u, and has the dimension of (I+L)×(I+L). In addition, in the documents of Note [1] and Note [2], the method of calculating each element in the noise matrix $R_u$ has been disclosed. Next, the inverse matrix of the matrix $R_n$ is calculated, so as to obtain the matrix $R_n^{-1}$ (Step S466). Finally, the noise weights $B_0\text{-}B_{I-1}$ is calculated according to the equation $\beta = R_n^{-1} R_{ns}\alpha$ (Step S468).

Referring to FIGS. 3 and 4 again, after the noise weights $B_0\text{-}B_{I-1}$ are generated, the multipliers 379_0-379_(I-1) in the noise combining unit 377 make the noise components $y_n(m_0)\text{-}y_n(m_{I-1})$ be multiplied by the corresponding noise weights $B_0\text{-}B_{I-1}$ and output the generated products to the summation unit 380 (Step S470). Then, the summation unit 380 sums up the received products, so as to obtain the interference-plus-noise estimation value $\hat{z}$ (Step S475). Finally, the adder 382 subtracts the interference-plus-noise estimation value $\hat{z}$ from the main signal x to obtain and output a de-spreading signal $\hat{x}$ (Step S480).

Figure 6:
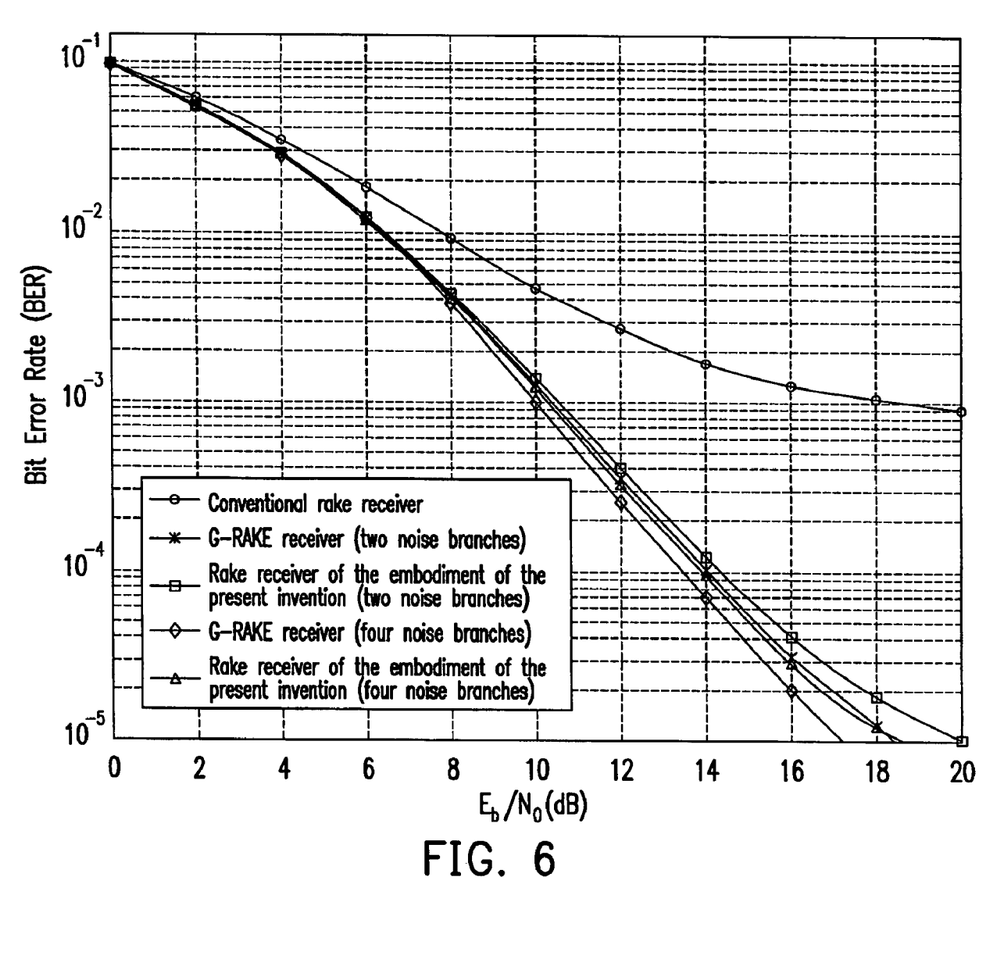
FIG. 6 is a trend chart of an error rate under different ratios between bit energy and noise energy $E_b/N_0$.

The performances of the conventional rake receiver, the G-RAKE receiver, and the rake receiver in the embodiment of the present invention are simulated below through software, and it is assumed that the above simulation employs a multipath Rayleigh fading channel. Spreading factor used by the system is 128, and the number of the multiple users is 32. FIG. 6 is a trend chart of an error rate under different ratios between bit energy and noise energy $E_b/N_0$. Referring to FIG. 6, the X-coordinate is the ratio of the bit energy to the noise energy $E_b/N_0$ with a unit of dB, and the Y-coordinate is the bit error rate. Five curves in FIG. 6 respectively represent the conventional rake receiver (the rake receiver in FIG. 1), the G-RAKE receiver (having two noise branches, that is, the delay time in the two noise branches are not the delay time the channel), the rake receiver in the embodiment of the present invention (having two noise branches), the G-RAKE receiver (having four noise branches, that is, the delay time in the four noise branches are not the delay time in the channel), and the rake receiver in the embodiment of the present invention (having four noise branches). In addition, the simulation environment of FIG. 6 is a multi-path channel having four paths, and the receivers simulated by the five curves of FIG. 6 all have four signal branches.

As viewed from FIG. 6 that, the bit error rate of the rake receiver in the embodiment of the present invention is significantly smaller than that of the conventional rake receiver. In addition, the bit error rate of the rake receiver in the embodiment of the present invention is quite close to that of the G-RAKE receiver. However, taking the G-RAKE receiver having four noise branches as an example, an 8*8 inverse matrix must be calculated, and as for the rake receiver having four noise branches according to the embodiment of the present invention only needs to calculate a 4*4 inverse matrix. Therefore, the rake receiver in the embodiment of the present invention can maintain the bit error rate equivalent to that of the G-RAKE receiver, and can also significantly reduce the operations required by the G_RAKE receiver.

To sum up, the embodiment of the present invention has the following advantages.

1. The rake receiver according to the embodiment of the present invention uses an interference-plus-noise estimation value to eliminate the noises in the main signal, so as to effectively improve the performance of the receiver and lower the bit error rate.

2. When calculating the noise weights, the conventional G-RAKE receiver needs to calculate the inverse matrix operation on the matrix $R_u$ with a dimension of J×J. However, when the rake receiver according to the embodiment of the present invention calculates the weights, it is only required to calculate the inverse matrix of the I×I sub-matrix $R_n$ in the matrix $R_u$. Therefore, the rake receiver according to the embodiment of the present invention can significantly reduce the operations required by the G-RAKE receiver.

3. When the rake receiver according to the embodiment of the present invention selects the preset times in the noise branches, merely the metric $|\beta_i|^2 E[|z_n(m_i)|^2]$ corresponding to each candidate needs to be calculated, and it is not necessary to calculate the inverse matrix of $R_n$ and the matrix multiplication, so as to reduce the calculations required when selecting the preset times.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rake receiver, adapted for de-spreading a received signal from a multi-path channel, comprising:
   a channel estimation module, for estimating a plurality of channel gains and a plurality of corresponding path delay times in the multi-path channel;
   L signal branches, for delaying the received signal for a plurality of signal delay times respectively to obtain a plurality of delayed received signals, de-spreading the delayed received signals respectively to output a plurality of signal components, wherein the signal delay times are respectively proportional to the path delay times, and L is a positive integer;
   I noise branches, for delaying the received signal for a plurality of preset times respectively to obtain a plurality of delayed noise signals, de-spreading the delayed noise signals to output a plurality of noise components respectively, wherein I is a positive integer; and
   a combiner, for combining the signal components to generate a main signal, combining the noise components to generate an interference-plus-noise estimation value, and outputting a de-spreading signal according to a difference between the main signal and the interference-plus-noise estimation value;
   wherein the combiner adjusts weights of the signal components in the main signal according to the channel gains, and adjusts weights of the noise components in the interference-plus-noise estimation value according to I noise weights.

2. The rake receiver as claimed in claim 1, wherein an $i^{th}$ signal branch among the L signal branches comprises:
   a delay unit, for delaying the received signal for an $i^{th}$ signal delay time to obtain an $i^{th}$ delayed received signal; and
   a de-spreader, for convolving the $i^{th}$ delayed received signal with a local spreading waveform, and sampling the convolved result to an $i^{th}$ signal component.

3. The rake receiver as claimed in claim 1, wherein an $i^{th}$ noise branch among the I noise branches comprises:
   a delay unit, for delaying the received signal for an $i^{th}$ preset time to obtain an $i^{th}$ delayed noise signal; and
   a de-spreader, for convolving the $i^{th}$ delayed noise signal with a local spreading waveform, and sampling the convolved result to an $i^{th}$ noise component.

4. The rake receiver as claimed in claim 1, wherein the combiner comprises:
   a signal combining unit, for combining the signal components according to L signal weights to generate and output the main signal, wherein the signal weights are obtained by the channel gains of the multi-path channel;
   a noise combining unit, for combining the signal components according to I signal weights to generate and output the interference-plus-noise estimation value; and
   an adder, subtracting the interference-plus-noise estimation value from the main signal, so as to output the de-spreading signal.

5. The rake receiver as claimed in claim 4, wherein the signal combining unit comprises:
   L multipliers, wherein an $i^{th}$ multiplier receives an $i^{th}$ signal component, and multiplies the $i^{th}$ signal component by an $i^{th}$ signal weight, so as to output an $i^{th}$ product; and
   a summation unit, for receiving and summing up the products to output the main signal.

6. The rake receiver as claimed in claim 4, wherein the noise combining unit comprises:
   I multipliers, wherein an $i^{th}$ multiplier receives an $i^{th}$ noise component, and multiplies the $i^{th}$ noise component by an $i^{th}$ noise weight, so as to output an $i^{th}$ product; and a summation unit, for receiving and summing up the products to output the interference-plus-noise estimation value.

7. The rake receiver as claimed in claim 6, wherein the signal weights are represented as $A_0$-$A_{L-1}$, and a signal weight vector formed by the conjugate value of the signal weights $A_0$-$A_{L-1}$ is represented as $\alpha=[A_0^*, \ldots, A_{L-1}^*]^T$; the noise weights are represented as $B_0$-$B_{I-1}$, and a noise weight vector formed by the conjugate value of the noise weights $B_0$-$B_{I-1}$ is represented as $\beta=[B_0^*, \ldots, B_{I-1}^*]^T$, and the rake receiver further comprises:

a noise weight calculating unit, for calculating the noise weights $B_0$-$B_{I-1}$ through a noise matrix $R_u$ and an equation $\beta=R_n^{-}R_{ns}\alpha$, and outputting the noise weights $B_0$-$B_{I-1}$ to the noise combining unit, wherein the noise matrix $R_u$ is a covariance matrix of a noise vector u, with a dimension of $(I+L)\times(I+L)$, the noise vector u comprises noise compositions in the signals components and the noise components, with a length of I+L, the matrix $R_n$ is a I×I sub-matrix at a bottom right corner of the noise matrix $R_u$, the matrix $R_{ns}$ is a I×L sub-matrix at a bottom left corner of the noise matrix $R_u$, and the superscript (−1) represents an inverse matrix operation.

8. The rake receiver as claimed in claim 7, further comprising:

a noise branch selecting unit, for selecting first I candidates having larger metrics from a plurality of candidates, so as to serve as the preset times, wherein the metric is $|\beta_i|^2 E[|z_n(m_i)|^2]$, the $i^{th}$ candidate corresponds to the $i^{th}$ preset time $m_i$, the $i^{th}$ noise branch generates the $i^{th}$ noise component $z_n(m_i)$ according to the $i^{th}$ preset time $m_i$, $\beta_i$ is a conjugate value of the noise weight corresponding to the $i^{th}$ noise component $z_n(m_i)$, and $E[\bullet]$ represents an expected value operation.

9. A de-spreading method used for a rake receiver, comprising:

estimating a plurality of channel gains and a plurality of corresponding path delay times in a multi-path channel;

receiving a received signal from the multi-path channel;

delaying the received signal for a plurality of signal delay times respectively to obtain a plurality of delayed received signals, de-spreading the delayed received signals respectively to obtain a plurality of signal components, wherein the signal delay times are respectively proportional to the path delay times;

delaying the received signal for a plurality of preset times respectively to obtain a plurality of delayed noise signals, de-spreading the delayed noise signals respectively to obtain a plurality of noise components;

adjusting weights of the signal components in a main signal respectively according to the channel gains, so as to combine the signal components to obtain the main signal;

adjusting weights of the noise components in an interference-plus-noise estimation value according to a plurality of noise weights, so as to combine the noise components to obtain the interference-plus-noise estimation value; and generating a de-spreading signal according to a difference between the main signal and the interference-plus-noise estimation value.

10. The de-spreading method as claimed in claim 9, wherein the step of obtaining the signal components comprises:

delaying the received signal for an $i^{th}$ signal delay time to obtain an $i^{th}$ delayed received signal; and convolving the $i^{th}$ delayed received signal with a local spreading waveform, and sampling the convolved result to an $i^{th}$ signal component.

11. The de-spreading method as claimed in claim 9, wherein the step of obtaining the noise components comprises:

delaying the received signal for an $i^{th}$ preset time to obtain an $i^{th}$ delayed noise signal; and convolving the $i^{th}$ delayed noise signal with a local spreading waveform, and sampling the convolved result to an $i^{th}$ noise component.

12. The de-spreading method as claimed in claim 9, wherein the step of adjusting weights of the signal components in a main signal respectively according to the channel gains so as to combine the signal components to obtain the main signal comprises:

generating a plurality of signal weights according to the channel gains;

multiplying the $i^{th}$ signal component by an $i^{th}$ signal weight, so as to generate an $i^{th}$ product; and summing up the products to obtain the main signal.

13. The de-spreading method as claimed in claim 12, wherein the step of adjusting weights of the noise components in an interference-plus-noise estimation value according to a plurality of noise weights so as to combine the noise components to obtain the interference-plus-noise estimation value comprises:

multiplying an $i^{th}$ noise component by an $i^{th}$ noise weight to generate an $i^{th}$ product; and summing up the products to obtain the interference-plus-noise estimation value.

14. The de-spreading method as claimed in claim 13, wherein a number of the signal components is L, a number of the noise components is I, the signal weights are represented as $A_0$-$A_{L-1}$, and a signal weight vector formed by a conjugate value of the signal weights $A_0$-$A_{L-1}$ is represented as $\alpha=[A_0^*, \ldots, A_{L-1}^*]^T$, the noise weights are represented as $B_0$-$B_{I-1}$, and a noise weight vector formed by a conjugate value of the noise weights $B_0$-$B_{I-1}$ is represented as $\beta=[B_0^*, \ldots, B_{I-1}^*]^T$, the de-spreading method further comprises:

calculating a I×I sub-matrix at a bottom right corner of a noise matrix $R_u$ to obtain a matrix $R_n$, wherein the noise matrix $R_u$ is a covariance matrix of a noise vector u, with a dimension of $(I+L)\times(I+L)$, and the noise vector u comprises noise compositions in the signals components and the noise components, with a length of I+L;

calculating a I×L sub-matrix at a bottom left corner of the noise matrix $R_u$ to obtain a matrix $R_{ns}$;

calculating an inverse matrix of the matrix $R_n$ to obtain a matrix $R_n^{-1}$, wherein the superscript (−1) represents an inverse matrix operation; and calculating the noise weights $B_0$-$B_{I-1}$ according to an equation $\beta=R_n^{-1}R_{ns}\alpha$.

15. The de-spreading method as claimed in claim 14, further comprising:

calculating a metric of an $i^{th}$ candidate among a plurality of candidates; and selecting first I candidates having larger metrics to serve as the preset times, wherein the metric is $|\beta_i|^2 E[|z_n(m_i)|^2]$, the $i^{th}$ candidate corresponds to the $i^{th}$ preset time $m_i$, the $i^{th}$ preset time $m_i$ corresponds to the $i^{th}$ noise component $z_n(m_i)$, $\beta_i$ is a conjugate value of the noise weight corresponding to the $i^{th}$ noise component, and $E[\bullet]$ represents an expected value operation.

* * * * *